INVENTOR.
DONUIL A. HILLIS,
BY Paul M. Coble
ATTORNEY.

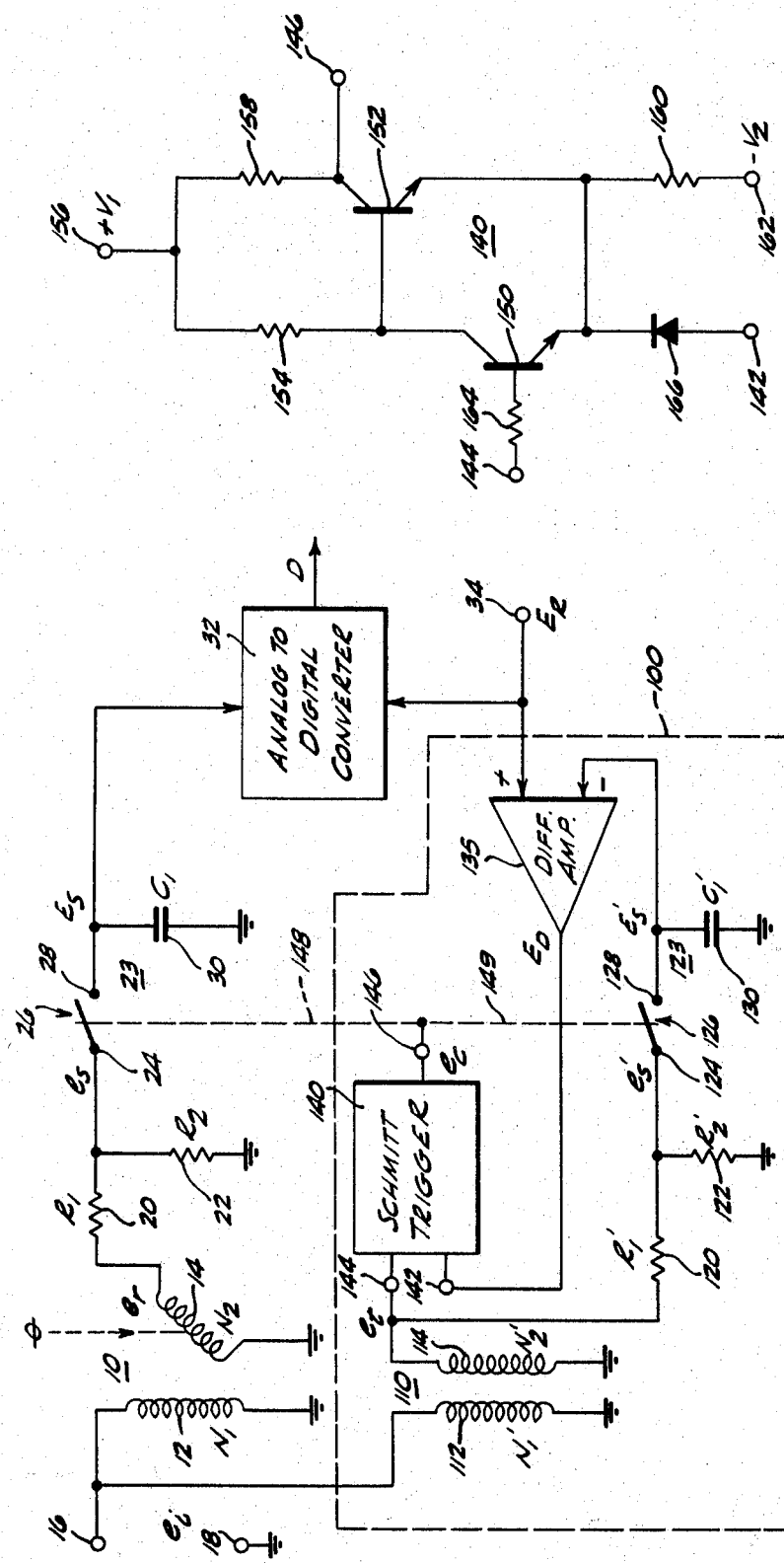

United States Patent Office 3,430,227
Patented Feb. 25, 1969

3,430,227
DRIFT COMPENSATION CIRCUIT FOR ANALOG-TO-DIGITAL CONVERTER
Donuil A. Hillis, Palos Verdes, Calif., assignor, by mesne assignments, to the United States of America as represented by the National Aeronautics and Space Administration
Filed May 13, 1965, Ser. No. 455,477
U.S. Cl. 340—347      8 Claims
Int. Cl. H04l 3/00; H03k 13/02, 17/00

ABSTRACT OF THE DISCLOSURE

Apparatus for providing an electrical representation of mechanical position information, in which the electrical output of a resolver driven by a shaft is periodically sampled and compared with a reference signal to produce a signal indicating the mechanical position of the shaft, wherein the sampling duration is varied by a control circuit so as to compensate for any fluctuations in auxiliary voltages.

Origin of the invention

Figure 3:
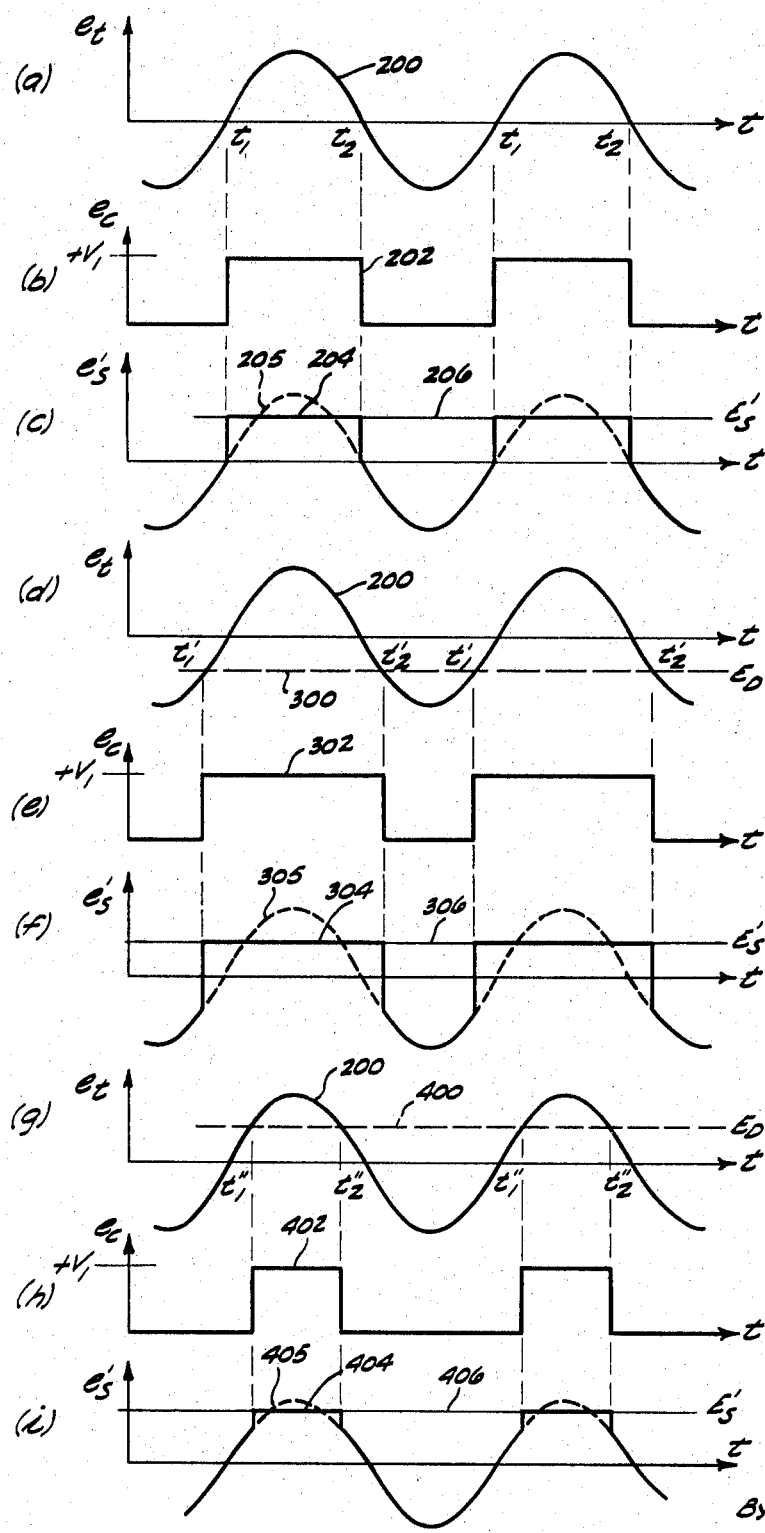

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to analog-to-digital conversion, and more particularly relates to a system for converting mechanical positional information into a digital electrical representation and incorporating unique circuitry which compensates for changes in auxiliary voltages used during the conversion.

In numerous digitally controlled servo systems such as digital computer controlled machine tools, industrial processes, and aircraft flight and fire control systems, it is necessary to accurately convert analog information in the form of the angular position of a rotatable shaft into digital electrical pulses. One scheme which has been used for carrying out such a conversion involves first converting the shaft positional information into an analog AC voltage by means of a resolver, then sampling and averaging the analog AC voltage, and finally encoding the averaged analog voltage into a digital representation. When employing such a technique it is necessary to excite the resolver with an AC voltage and to compare the averaged analog voltage with a DC reference voltage. However, the resultant digital output signal becomes a function of both the resolver excitation voltage and the DC reference voltage. The excitation and reference voltages are subject to fluctuation on account of power supply drift, temperature and loading changes, and other power supply transients. Therefore, when changes occur in the resolver excitation and DC reference voltages, errors are developed in the digital representation.

Accordingly, it is an object of the present invention to provide a system for converting mechanical positional information into a digital electrical representation in which the digital output is independent of auxiliary operating voltages, thereby eliminating the need for highly regulated, elaborate power supplies.

It is a further object of the present invention to provide a shaft position-to-digital conversion system including a resolver, sampling and averaging circuit, and analog-to-digital voltage converter which is less sensitive to temperature changes, aging, load variations, and power supply transients than similar systems of the prior art.

It is a still further object of the present invention to provide a system for converting mechanical positional information into a DC voltage with extremely high accuracy and reliability.

It is still another object of the present invention to provide circuitry for processing electrical output signals from a resolver which automatically compensates for changes in the resolver excitation voltage with respect to a DC reference voltage.

In accordance with the objects set forth above, the compensation circuitry of the present invention includes a switch coupled to a source of alternating input voltage for periodically sampling the input voltage during a sampling interval, a capacitance coupled to the switch for storing a voltage representative of the average value of the alternating input voltage during the sampling interval, means for comparing the voltage stored by the capacitance with a reference voltage and for producing a voltage indicative of the difference between the reference voltage and the voltage stored by the capacitance, and control means responsive to the alternating input voltage and the difference voltage for adjusting the sampling interval such that the voltage stored by the capacitance essentially equals the reference voltage.

The aforedescribed compensation circuitry is particularly useful in a system for converting mechanical positional information into a digital electrical representation. The rotor of a resolver is driven in accordance with the mechanical positional information, while the stator winding of the resolver is excited with the aforementioned alternating input voltage. The voltage induced in the rotor winding is processed through circuitry including a sampling switch driven in time coincidence with the sampling switch of the compensation circuitry, an averaging capacitance, and an analog-to-digital converter which produces a digital representation of the voltage across the averaging capacitance relative to the aforementioned reference voltage. The resulting digital representation is essentially independent of both the alternating input voltage and the reference voltage.

The exact nature of the invention, as well as additional objects, advantages and characteristic features thereof, will become readily apparent from the following detailed description of a preferred embodiment of the invention when considered in conjunction with the accompanying drawings in which:

FIG. 1 schematically illustrates a system according to the present invention;

FIG. 2 is a schematic circuit diagram showing the Schmitt trigger of the system of FIG. 1; and FIGS. 3(a)–(i) illustrate timing waveforms used in explaining the operation of the system of FIG. 1.

Referring to FIG. 1 with greater particularly, a system in accordance with the present invention may be seen to include a shaft driven variable ratio transformer or resolver, 10 having a stator winding 12 and a rotor winding 14, with a predetermined ratio of rotor turns $N_2$ to stator turns $N_1$. The angular position of the rotor 14 with respect to the stator 12 is determined by the mechanical positional information to be encoded into a digital signal and is represented by $\theta$ in FIG. 1. Input terminals 16 and 18 connected to opposite ends of the stator winding 12 are adapted to receive an AC excitation voltage $e_i$, which may be a 115 volt sine wave at 1600 c.p.s. for example. Although a resolver usually employs a pair of stator windings arranged in quadrature, as well as a similar pair of rotor windings, it is only necessary to utilize one stator winding and one rotor winding in the system illustrated and described herein.

The voltage $e_r$ appearing across the rotor winding 14 is applied to a voltage divider consisting of resistors 20 and 22 connected in series across the rotor winding 14 and having respective resistance values $R_1$ and $R_2$. The divided voltage $e_s$ appearing across the resistor 22 is applied to a sampling and averaging circuit 23 consisting of a switching device 26 and a capacitor 30. Although shown as a simple mechanical switch for illustrative purposes, the switch 26 may be an electronic switching device having a current path capable of being rendered conductive and nonconductive by an electrical control signal. The switch 26 has a first terminal 24 connected to the junction between resistors 20 and 22, and a second terminal 28 connected to one terminal of the capacitor 30, the other capacitor terminal being grounded. The capacitance $C_1$ of the capacitor 30 is made sufficiently large so that the time constant of the capacitor 30 in conjunction with resistors 20 and 22 is substantially longer than a half cycle of the excitation waveform $e_i$. In typical operation the switch 26 may be closed during the half cycles of one polarity of the excitation waveform $e_i$ and kept open during the half cycles of opposite polarity so as to rectify the voltage $e_s$.

The resultant DC voltage $E_s$ stored across the capacitor 30 is applied to an analog-to-digital converter 32 which may be of the type shown in FIGURE 1 of an article "High Speed A/D Conversion with Semiconductors," by R. C. Platzek et al., Automatic Control, August 1961, pages 37–41. The analog-to-digital converter 32 compares the voltage $E_s$ with a DC reference voltage $E_R$, which may be $+100$ volts for example, from a terminal 34 and provides a digital representation D of the voltage ratio $E_s/E_R$ in the form of binary coded pulses.

It is pointed out that although FIG. 1 illustrates only a single channel (including a resolver, resistive voltage divider, and sampling and averaging circuit) for deriving an analog voltage indicative of mechanical positional information and applying it to the analog-to-digital converter 32, a plurality of such channels may be coupled in parallel between the input terminals 16 and 18 and the analog-to-digital converter 32. In such an arrangement the resolver in each channel would be driven by the same excitation voltage $e_i$; however, each channel would process a different item, e.g., $\theta_1$, $\theta_2$, etc., of mechanical positional information.

In order to gain a better understanding of the operation of the circuitry described above and the problems associated therewith, assume that an input voltage $e_i$ given by $$e_i = E_i \sin \omega t \qquad (1)$$

is applied between the input terminals 16 and 18. For a resolver rotor angle $\theta$ the voltage $e_r$ induced in the rotor winding 14 may be expressed as $$e_r = e_i K_r \sin \theta = K_r E_i \sin \theta \sin \omega t \qquad (2)$$

where $$K_r = N_2/N_1 \qquad (3)$$

The resultant voltage $e_s$ appearing at terminal 24 of the switch 26 is $$e_s = K_d e_r = K_d K_r E_i \sin \theta \sin \omega t \qquad (4)$$

where $$K_d = \frac{R_2}{R_1 + R_2} \qquad (5)$$

In order to periodically sample the voltage $e_s$, the switch 26 is closed (by means to be described later) at a time $t_1$ and remains closed until it is opened at a subsequent time $t_2$, being closed again at the following time $t_1$. The capacitor 30 charges to a voltage $E_s$ which, on account of the long time constant of its discharge path, remains essentially constant. Since the input to the analog-to-digital converter 32 and the capacitor 30 present an essentially infinite impedance to the flow of direct current, the direct current flow through the switch 26 is essentially zero. Since no current flows through the switch 26 during the time interval $t_2$ to $t_1$ when the switch is open, the average value of the alternating current which flows through the switch 26 during the time interval $t_1$ to $t_2$ when the switch is closed must be zero. The average value of the voltage $(E_s - e_s)$ across the switch 26 during the time interval $t_1$ to $t_2$ must also be zero, and hence the voltage $E_s$ to which the capacitor 30 is charged is equal to the average value $\overline{e_s}$ of the voltage applied to the switch terminal 24 during the time interval $t_1$ to $t_2$. Expressed mathematically $$E_s = \overline{e_s} = \frac{1}{(t_2 - t_1)} \int_{t_1}^{t_2} e_s \, dt \qquad (6)$$

Substituting Equation 4 into Equation 6 yields $$E_s = \frac{K_d K_r E_i}{(t_2 - t_1)} \sin \theta \int_{t_1}^{t_2} \sin \omega t \, dt \qquad (7)$$

The analog-to-digital converter 32 produces a digital representation D indicative of the ratio of the voltage $E_s$ to the reference voltage $E_R$. Thus, the digital output D may be approximated mathematically as $$D = \frac{E_s}{E_R} = \frac{E_i K_d K_r \sin \theta}{E_R (t_2 - t_1)} \int_{t_1}^{t_2} \sin \omega t \, dt \qquad (8)$$

In conventional circuitry of the foregoing type the switch 26 is maintained closed during constant time intervals synchronized with the resolver excitation voltage $e_i$, typically during the positive half cycles of the voltage $e_i$. Thus, letting $t_1 = 0$ and $t_2 = \pi/\omega$, integration of Equation 8 yields $$D = \frac{E_i K_d K_r \sin \theta}{E_R \left(\frac{\pi}{\omega}\right)} \left[\frac{-\cos \omega t}{\omega}\right]_0^{\pi/\omega} \qquad (9)$$

which evaluates to $$D = \frac{E_i}{E_R} K_1 \sin \theta \qquad (10)$$

where $$K_1 = \frac{2 K_d K_r}{\pi} \qquad (11)$$

It may be observed from Equation 10 that the digital output D not only is a function of the rotor angle $\theta$, as desired, but is also a function of the excitation voltage magnitude $E_i$ and the reference voltage $E_R$. Thus, when the voltage $E_i$ changes with respect to the voltage $E_R$, as a result of power supply drift, temperature changes, aging or load variations for example, the digital output signal D will change and hence will not be an accurate representation of the angular position $\theta$.

The compensation circuitry according to the present invention, illustrated generally within the dashed lines 100 of FIG. 1, adjusts the times $t_1$ and $t_2$ when the switch 26 is closed and opened, respectively, so that the averaging function $$\frac{1}{(t_2 - t_1)} \int_{t_1}^{t_2} \sin \omega t \, dt$$

varies in a manner to compensate for changes in $E_i$ with respect to $E_R$, making the digital representation D independent of $E_i$ and $E_R$. More specifically, the compensation circuitry includes a transformer 110 having a primary winding 112 and a secondary winding 114, with a predetermined ratio of secondary turns $N_2'$ to primary turns $N_1'$. The primary winding 112 is coupled between the input terminals 16 and 18 so as to receive the resolver excitation voltage $e_i$.

The voltage $e_t$ appearing across the secondary winding 114 of the transformer 110 is applied to a voltage divider consisting of resistors 120 and 122, having respective resistance values $R_1'$ and $R_2'$, connected in series across the winding 114. The divided voltage $e_s'$ appearing across the resistor 122 is applied to a sampling and averaging circuit 123 consisting of a switch 126 and a capacitor 130. The switch 126 may be the same as the switch 26 and is shown as having a first terminal 124 connected to the junction between resistors 120 and 122 and a second terminal 128, with the capacitor 130 connected between the terminal 128 and ground. The capacitor 130 provides a capacitance $C_1'$ which in conjunction with resistance $R_1'$ and $R_2'$ affords a time constant substantially longer than a half cycle of the excitation voltage $e_1$.

The resultant DC voltage $E_s'$ stored across the capacitor 130 is applied to one input to a differential amplifier 135, the other input to the amplifier 135 being the DC reference voltage $E_R$ from the terminal 34. For purposes of illustration the differential amplifier 135 is shown as subtracting the voltage $E_s'$ from the reference voltage $E_R$, although it should be understood that the relative polarity of the input voltages to the differential amplifier may be reversed. An example of a particular circuit which may be employed for the differential amplifier 135 is the circuit shown in FIGURE 2 of an article, "Differential Amplifier Features D-C Stability," by W. T. Matzen et al., Electronics, Jan. 16, 1959, pages 60–62.

The output voltage $E_D$ from the differential amplifier 135, which is indicative of the difference between the reference voltage $E_R$ and the stored capacitor voltage $E_s'$, is applied to a threshold level control terminal 142 of a Schmitt trigger circuit 140. Trigger input terminal 144 for the Schmitt trigger circuit 140 receives the voltage $e_t$ developed across the secondary winding 114 of the transformer 110. The signal $e_c$ provided at output terminal 146 from the Schmitt trigger 140 is applied via control paths 148 and 149 to the respective switches 26 and 126 to control the opening and closing of the switches 26 and 126.

A particular circuit which may be employed for the Schmitt trigger 140 is illustrated in FIG. 2 and may include a first transistor 150 having its collector electrode directly connected to the base electrode of a second transistor 152 and also coupled via a resistor 154 to a terminal 156 furnishing a positive supply voltage $+V_1$. The collector electrode of the second transistor 152 is coupled to the positive supply terminal 156 through resistor 158 and is also directly connected to the output terminal 146. The emitter electrode of the transistor 152 is directly connected to the emitter electrode of transistor 150 and is also coupled via a resistor 160 to a terminal 162 providing a negative supply voltage $-V_2$. The base electrode of transistor 150 is coupled to the trigger input terminal 144 by means of a resistor 164, while a diode 166 has its cathode connected to the common emitter electrodes of the transistors 150 and 152 and its anode connected to the threshold level control terminal 142.

In the operation of the Schmitt trigger circuit 140, assume that zero volts are applied to the threshold level control terminal 142. As long as the voltage applied to the trigger input terminal 144 is negative, the transistor 150 is nonconductive, and the resultant positive potential at the collector electrode of transistor 150 biases the transistor 152 to a conductive condition. A current flow path is established through resistor 158, transistor 152 and resistor 160 to the negative terminal 162, as well as through diode 166 and resistor 160 to the terminal 162. The output terminal 146 from the Schmitt trigger 140 thus resides at a potential of essentially zero volts. In this condition no control signal is applied via control paths 148 and 149 to the respective switches 26 and 126, and the switches 26 and 126 assume an open position.

When the voltage applied to the trigger input terminal 144 becomes positive, the transistor 150 is rendered conductive, and the resultant drop in potential at the collector electrode of the transistor 150 cuts off the transistor 152. The potential at the output terminal 146 rises to a level of essentially $+V_1$ volts, providing a signal $e_c$ on control paths 148 and 149 to close the respective switches 26 and 126. When the potential applied to the trigger input terminal 144 again becomes negative, the transistor 150 is cut off, causing the transistor 152 to become conductive and thereby returning the potential at the output terminal 146 to essentially zero volts. This removes the control signal $e_c$ from the control paths 148 and 149, thereby opening the switches 26 and 126.

The operation of the circuitry including transformer 110, resistors 120 and 122, and sampling and averaging circuit 123 is similar to that described above with respect to the resolver 10, resistors 20 and 22, and sampling and averaging circuit 23. Since the resolver excitation voltage $e_1$ is applied to the primary winding 112 of the transformer 110, by analogy with Equations 2, 4, 6 and 7, the voltage $E_s'$ developed across the capacitor 130 becomes $$E_s' = \frac{K_d' K_t E_i}{(t_2 - t_1)} \int_{t_1}^{t_2} \sin \omega t \, dt \tag{12}$$

where $$K_d' = \frac{R_2'}{R_1' + R_2'} \tag{13}$$

and $$K_t = N_2'/N_1' \tag{14}$$

As long as the voltage $E_s'$ across the capacitor 130 is equal to the reference voltage $E_R$, the differential amplifier output voltage $E_D$ which is applied to the Schmitt trigger threshold control terminal 142 is zero. Hence, the Schmitt trigger output voltage $e_c$ resides at a level essentially equal to $+V_1$ during the positive half cycles of the voltage $e_t$ at the trigger terminal 144 and at a level essentially equal to zero during the negative half cycles of the voltage $e_t$. The switches 26 and 126 thus assume a closed position during the positive half cycles ($t_1$ to $t_2$) of the excitation voltage $e_1$ and remain open during the negative half cycles ($t_2$ to $t_1$) of the voltage $e_1$.

The foregoing set of conditions are summarized in FIGS. 3(a)–(c), with the waveform 200 of FIG. 3(a) illustrating the voltage $e_t$ applied to the Schmitt trigger input terminal 144, the waveform 202 of FIG. 3(b) showing the Schmitt trigger output voltage $e_c$, and the waveform 204 of FIG. 3(c) depicting the voltage $e_s'$ at the switch terminal 124. The dashed waveform 205 of FIG. 3(c) illustrates the equivalent voltage which would be present at the terminal 124 during the time interval $t_1$ to $t_2$ if the averaging capacitor 130 were omitted. As is shown by the line 206 of FIG. 3(c), the voltage $E_s'$ across the capacitor 130 resides at a level equal to the average value of the waveform 205 during the time interval $t_1$ to $t_2$.

In the event of an increase in the magnitude $E_i$ of the excitation voltage $e_1$ relative to the reference voltage $E_R$, the capacitor voltage $E_s'$ will tend to increase in accordance with Equation 12. The output voltage $E_D$ from the differential amplifier 135 becomes negative, thus lowering the trigger level of the Schmitt trigger circuit 140 to a new level illustrated by the line 300 of FIG. 3(d). As a result, the Schmitt trigger circuit 140 is triggered to its state producing an output voltage of $+V_1$ at an earlier time $t_1'$ and remains in this state until a later time $t_2'$ than the respective times $t_1$ and $t_2$ discussed above, producing an output voltage $e_c$ illustrated by the waveform 302 of FIG. 3(e). The switches 26 and 126 are thus maintained in a closed position for a time interval $t_1'$ to $t_2'$ which is longer than the time interval $t_1$ to $t_2$. The voltage $e_s'$ at the switch terminal 124 assumes the waveform 304 of FIG. 3(f), with the dashed waveform 305 indicating the equivalent voltage which would be present at the terminal 124 during the time interval $t_1'$ to $t_2'$ if the capacitor 130 were omitted. As may be seen by comparing the waveform 305 of FIG. 3(f) with the waveform 205 of FIG. 3(c), the average value of the waveform 305 during the time interval $t_1'$ to $t_2'$ is less than the average value of the waveform 205 during the time interval $t_1$ to $t_2$. Thus, the voltage $E_s'$ stored across the capacitor 130 decreases to a new level illustrated by the line 306 of FIG. 3(f), thereby compensating for the original increase in the voltage $E_s'$ due to the increase in the voltage $E_i$.

In the event of a decrease in the magnitude $E_i$ of the 140 is thus raised to a new level depicted by the line 400 of FIG. 3(g). The Schmitt trigger level output voltage excitation voltage $e_i$ relative to the reference voltage $E_R$, the capacitor voltage $E_s'$ will tend to decrease, causing the differential amplifier output voltage $E_D$ to become positive. The trigger level of the Schmitt trigger circuit $e_c$, shown by the waveform 402 of FIG. 3(h), assumes the level of $+V_1$ at a later time $t_1''$ and is returned to the zero level at an earlier time $t_1''$ so that the switches 26 and 126 remain closed for a shorter time interval than before. The voltage $e_s'$ at the switch terminal 124 assumes the waveform 404 of FIG. 3(i), with the dashed waveform 405 indicating the equivalent voltage which would be present at the terminal 124 during the time interval $t_1''$ to $t_2''$ if the capacitor 130 were omitted. Comparison of the waveform 405 of FIG. 3(i) with the waveform 205 of FIG. 3(c) will reveal that the average value of the waveform 405 during the time interval $t_1''$ to $t_2''$ is greater than the average value of the waveform 205 during the time interval $t_1$ to $t_2$. The resultant voltage $E_s'$ across the capacitor 130 increases to a level illustrated by the line 406 of FIG. 3(i), thereby compensating for the original decrease in the excitation voltage magnitude $E_i$.

It will be apparent that the trigger level of the Schmitt trigger circuit 140 is adjusted so that the switches 26 and 126 remain closed for a duration $t_1$ to $t_2$ which causes the voltage $E_s'$ to follow the reference voltage $E_R$. Therefore, by setting $E_s' = E_R$, Equation 12 can be rewritten as $$E_R = \frac{K_d' K_t E_i}{(t_2 - t_1)} \int_{t_1}^{t_2} \sin \omega t \, dt \tag{15}$$

Substituting Equation 15 into Equation 8 yields $$D = \frac{\frac{E_i K_d K_r}{(t_2 - t_1)} \sin \theta \int_{t_1}^{t_2} \sin \omega t \, dt}{\frac{E_i K_d' K_t}{(t_2 - t_1)} \int_{t_1}^{t_2} \sin \omega t \, dt} \tag{16}$$

If the respective components in the circuit of FIG. 1 are adjusted so that $$K_d = K_d' \text{ and } K_r = K_t$$

then Equation 16 reduces to $$D = \sin \theta \tag{17}$$

It may be seen from Equation 17 that the system of the present invention renders the digital output D from the analog-to-digital converter 32 independent of the excitation voltage $e_i$ and the reference voltage $E_R$, thereby providing more accurate signal conversion and eliminating the need for highly regulated power supplies. In addition, a shaft position-to-digital conversion system is provided which is less sensitive to temperature changes, aging, load variations, and power supply transients than similar systems of the prior art.

A system in accordance with the present invention has been illustrated as operating with a positive reference voltage $E_R$. It should be understood, however, that such a system is equally suited for operation with a negative reference voltage, in which case the Schmitt trigger 140 should maintain the switches 26 and 126 closed during the negative half cycles of the excitation waveform $e_i$. This can be readily accomplished by grounding the center of the transformer secondary winding 114, and by applying the secondary winding signal in phase with the voltage $e_r$ to resistor 120 and the secondary winding signal 180° out of phase with respect to the voltage $e_r$ to the Schmitt trigger input terminal 144.

Thus, although the present invention has been shown and described with respect to a particular embodiment, nevertheless, various changes and modifications obvious to a person skilled in the art to which the invention pertains are deemed to lie within the spirit, scope, and contemplation of the invention as set forth in the appended claims.

What is claimed is:

1. In a signal processing system: a source of alternating voltage, switching means coupled to said source of alternating voltage for periodically sampling said alternating voltage during a sampling interval, capacitance means coupled to said switching means for storing a voltage representative of the average value of said alternating voltage during said sampling interval, means for comparing the voltage stored by said capacitance means with a reference voltage and for producing a difference voltage indicative of the difference between said reference voltage and the stored voltage, and control means responsive to said alternating voltage and a second reference voltage for adjusting said sampling interval so as to compensate for any variations in said alternating voltage.

2. In a signal processing system: a source of alternating voltage, trigger means for producing a control signal, switching means responsive to said control signal for periodically sampling said alternating voltage during a sampling interval determined by the duration of said control signal, capacitance means for storing a voltage representative of the average value of said alternating voltage during said sampling interval, differential means for comparing the voltage stored by said capacitance means with a reference voltage and for producing a first difference voltage indicative of the difference between said reference voltage and said storage voltage, means for producing a second difference voltage indicative of the difference between a second reference voltage and said alternating voltage, and means for applying said second difference voltage to said trigger means to vary the duration of said control signal such that said sampling interval is varied so as to compensate for any variation in said alternating voltage.

3. In a signal processing system: a transformer having a primary winding and a secondary winding, means for applying an alternating voltage to said primary winding, a switch having first and second terminals, said first terminal being coupled to one terminal of said secondary winding, a capacitor coupled between said second terminal and another terminal of said secondary winding, differential amplifier means for comparing the voltage across said capacitor with a reference voltage and for producing a difference voltage indicative of the difference between said reference voltage and the voltage across said capacitor, trigger means for producing a control signal as long as said alternating voltage has a predetermined relationship with respect to a threshold voltage, means for applying said control signal to said switch to establish a conductive path between said first and second terminals during the duration of said control signal, and means for applying said difference voltage to said trigger means to vary said threshold voltage in accordance with said difference voltage such that said control signal is of a duration to maintain said conductive path for a time allowing the voltage across said capacitor to essentially equal said reference voltage.

4. In a signal processing system: a transformer having a primary winding and a secondary winding; means for applying an alternating voltage to said primary winding; a voltge divider having first, second, and intermediate terminals; said first and second terminals of said voltage divider being connected to different portions of said secondary winding; a switch having first and second terminals; said first terminal of said switch being coupled to said intermediate terminal of said voltage divider; a capacitor coupled between said second terminal of said switch and said second terminal of said voltage divider; differential amplifier means for comparing the voltage across said capacitor with a reference voltage and for producing a difference voltage indicative of the difference between said reference voltage and the voltage across said capacitor; a trigger circuit having a trigger input terminal coupled to said secondary winding, a threshold level control terminal for receiving said difference voltage, and an output terminal for providing a control signal as long as the voltage applied to said trigger input terminal has a predetermined relationship with respect to the voltage applied to said threshold level control terminal; and means responsive to said control signal for controlling said switch to establish a conductive path between said first and second terminals during the duration of said control signal.

5. A system for converting mechanical positional information into a digital electrical representation comprising: a source of alternating input voltage, means for modulating said alternating input voltage in accordance with mechanical positional information to be converted into a digital representation, first switching means coupled to said modulating means for periodically sampling the modulated alternating voltage during a sampling interval, first capacitance means coupled to said first switching means for storing a voltage representative of the average value of said modulated alternating voltage during said sampling interval, means for producing a digital representation of the voltage stored by said first capacitance means relative to a reference voltage, second switching means coupled to said source of alternating input voltage for periodically sampling said alternating input voltage during said sampling interval, second capacitance means coupled to said second switching means for storing a voltage representative of the average value of said alternating input voltage during said sampling interval, means for comparing the voltages store by said second capacitance means with said reference voltage and for producing a difference voltage indicative of the difference between said reference voltage and the voltage stored by said second capacitance means, and control means responsive to said alternating input voltage and said difference voltage for adjusting said sampling interval such that the voltage stored by said second capacitance means essentially equals said reference voltage, whereby said digital representation is essentially independent of said alternating input voltage and said reference voltage.

6. A system for converting mechanical positional information into a digital electrical representation comprising: a source of alternating input voltage, means for modulating said alternating input voltage in accordance with mechanical positional information to be converted into a digital representation, trigger means for producing a control signal as long as said alternating input voltage has a predetermined relationship with respect to a threshold voltage, first switching means responsive to said control signal for periodically sampling the modulated alternating voltage during a sampling interval determined by the duration of said control signal, first capacitance means for storing a voltage representative of the average value of said modulated alternating voltage during said sampling interval, means for producing a digital representation of the voltage stored by said capacitance means relative to a reference voltage, second switching means responsive to said control signal for periodically sampling said alternating input voltage during said sampling interval, second capacitance means for storing a voltage representative of the average value of said alternating input voltage during said sampling interval, differential means for comparing the voltage stored by said second capacitance means with said reference voltage and for producing a difference voltage indicative of the difference between said reference voltage and the voltage stored by said second capacitance means, and means for applying said difference voltage to said trigger means to vary said trigger voltage in accordance with said difference voltage such that the duration of said control signal and hence said sampling interval is varied in a manner to render the voltage stored by said second capacitance means essentially equal to said reference voltage, whereby said digital representation is essentially independent of said alternating input voltage and said reference voltage.

7. A system for converting mechanical positional information into a digital electrical representation comprising: a resolver having a stator winding and a rotor winding, the angular position of said rotor winding with respect to said stator winding being representative of mechanical positional information to be converted into a digital representation, a transformer having a primary winding and a secondary winding, the ratio of turns in said secondary winding to turns in said primary winding being essentially equal to the ratio of turns in said rotor winding to turns in said stator winding, means for applying an alternating excitation voltage to said stator winding and to said primary winding, a first switch having first and second terminals, said first terminal of said first switch being coupled to one terminal of said rotor winding, a first capacitor coupled between said second terminal of said first switch and another terminal of said rotor winding, means for producing a digital representation of the voltage across said first capacitor relative to a reference voltage, a second switch having first and second terminals, said first terminal of said second switch being coupled to one terminal of said secondary winding, a second capacitor coupled between said second terminal of said second switch and another terminal of said secondary winding, said another terminal of said rotor winding being coupled to said another terminal of said secondary winding, differential amplifier means for comparing the voltage across said second capacitor with said reference voltage and for producing a difference voltage indicative of the difference between said reference voltage and the voltage across said second capacitor, trigger means for producing a control signal as long as said alternating excitation voltage has a predetermined relationship with respect to a threshold voltage, means for applying said control signal to each of said first and second switches to establish respective conductive paths between their said first and second terminals during the duration of said control signal, and means for applying said difference voltage to said trigger means to vary said threshold voltage in accordance with said difference voltage such that said control signal is of a duration to maintain said conductive paths for a time allowing the voltage across said second capacitor to essentially equal said reference voltage, whereby said digital representation is essentially independent of the magnitude of said alternating excitation voltage and said reference voltage.

8. A system for converting mechanical positional information into a digital electrical representation comprising: a resolver having a stator winding and a rotor winding, the angular position of said rotor winding with respect to said stator winding being representative of mechanical positional information to be converted into a digital representation; a transformer having a primary winding and a secondary winding, the ratio of turns in said secondary winding to turns in said primary winding being essentially equal to the ratio of turns in said rotor winding to turns in said stator winding, means for applying an alternating excitation voltage to said stator winding and to said primary winding; first and second voltage dividers each having first, second, and intermediate terminals and each having essentially the same voltage dividing ratio; said first and second terminals of said first voltage divider being connected to different portions of said rotor winding; said first and second terminals of said second voltage divider being connected to different portions of said secondary winding; said second terminals of said first and second voltage dividers being connected together; first and second switches each having first and second terminals; said first terminal of said first switch being coupled to said intermediate terminal of said first voltage divider; said first terminal of said second switch being coupled to said intermediate terminal of said second voltage divider; a first capacitor coupled between said second terminal of said first switch and said second terminal of said first voltage divider; a second capacitor coupled between said second terminal of said second switch and said second terminal of said second voltage divider; means for producing a digital representation of the voltage across said first capacitor relative to a reference voltage; differential amplifier means for comparing the voltage across said second capacitor with said reference voltage and for producing a difference voltage indicative of the difference between said reference voltage and the voltage across said second capacitor; a trigger circuit having a trigger input terminal coupled to said secondary winding, a threshold level control terminal for receiving said difference voltage, and an output terminal for providing a control signal as long as the voltage applied to said trigger input terminal has a predetermined relationship with respect to the voltage applied to said threshold level control terminal; and means responsive to said control signal for controlling said first and second switches to establish respective conductive paths between their said first and second terminals during the duration of said control signal, whereby said digital representation is essentially independent of the magnitude of said alternating excitation voltage and said reference voltage.

References Cited

UNITED STATES PATENTS 3,116,458 12/1963 Margopoulos _____ 328—151
3,207,998 9/1965 Corney et al. _____ 328—151

MAYNARD R. WILBUR, *Primary Examiner.*

JEREMIAH GLASSMAN, *Assistant Examiner.*

U.S. Cl. X.R.

328—151